United States Patent Office 3,639,324
Patented Feb. 1, 1972

3,639,324
COATING COMPOSITION OF COPOLYMERIC VINYLIDENE CHLORIDE, PROCESS OF PREPARATION THEREOF, AND ARTICLES COATED THEREWITH
Daniel Kenyon Owens, Bon Air, Va., assignor to E. I. du Pont de Nemours and Company, Wilmington, Del.
No Drawing. Filed Oct. 13, 1969, Ser. No. 865,982
Int. Cl. C08f 45/24, 45/52
U.S. Cl. 260—28.5 D
11 Claims

ABSTRACT OF THE DISCLOSURE

A coating composition is provided comprising behenic acid and a copolymer of vinylidene chloride wherein the copolymer is of between about 60 parts and about 95 parts by weight of vinylidene chloride and includes a non-ionic surfactant said composition being especially adapted for coating film structures of organic thermoplastic polymeric material. A process for preparing said compositions characterized by continuous addition of monomeric materials into an aqueous dispersion containing a reduction-oxidation initiator, a non-ionic surfactant and behenic acid also is provided.

---

The present invention relates to coating compositions, process of preparation thereof and an article of manufacture prepared therewith. More particularly, the present invention is directed to improvements in and relating to a coating composition of polymerized vinylidene chloride and to laminar structures comprising a base film coated therewith.

Coating compositions of vinyl polymers and copolymers useful, for example, for coating base film structures such as transparent regenerated cellulose, are well known. To illustrate, U.S. Pat. 2,570,478 describes the coating of flexible and transparent regenerated cellulose film structures with copolymer compositions of vinylidene chloride, acrylonitrile and itaconic acid. Such laminar or coated film structures are desirable for use as packaging materials because they are characterized by a unique combination of physical properties such as heat-sealability, good barrier performance in respect to protection against permeation of water vapor or undesired gases as well as resistance of the structure to permeation of greases and the like. The above-mentioned coating compositions are characterized by vinylidene chloride copolymer aqueous dispersions with ionic surfactants. As indicated, these dispersions are quite satisfactory for many purposes, but they tend to fail when used as coatings in moist atmospheres. Specifically, the main drawback of such laminar or coated film structures resides in the lack of adhesion of the coating composition to the base film structure, especially wherein the film structure is to be used under conditions of high relative humidity or where the resulting film structure is to be used as a wrapping for articles such as, for example, candy having a high moisture content. As pointed out in the aforementioned patent, prior efforts to adhere polymeric coatings of vinylidene chloride to base film structures such as regenerated cellulose have included the application first of an anchoring sub-coating to the base film structures followed directly by applying the vinylidene chloride polymeric coating to the anchoring sub-coating. Other efforts have included incorporating a reactive water soluble resin into the base film structure during its manufacture. For example, resins such as the cationic urea-formaldehyde or melamine-formaldehyde resins have been incorporated in the base film structure at the softener bath stage in the manufacture of the regenerated cellulose base sheet. The latter is largely undesirable because it is difficult to control the concentration of the resin that is incorporated into the regenerated cellulose base film, and furthermore, the resin on the surface of the gel film tends to adhere to the surface of the drying rolls during the drying operation leading to non-uniform drying of the base sheet. Thus, the results of prior efforts to adhere polymerized vinyl chloride coating compositions to base film structures such as those of regenerated gel cellulose have not proven entirely satisfactory. Additionally, the preparation of aqueous vinylidene chloride polymer dispersions in the absence of a surfactant results in dispersions which tend to be unstable; even the best of such dispersions have short-comings with respect to their resistance to moist atmospheres. Improved coating compositions comprising copolymers of vinylidene chloride having improved adhesion characteristics to base film structures of, for example, polypropylene have been formulated by incorporating a non-ionic surfactant therein. Film structures coated with such compositions show definitely improved adhesion of the coating to the base and such coated film structures give a decided improvement in their performance when used in moist atmospheres or for the wrapping of highly moist products. However, such coated film structures have a deficiency in that when the coated films are used in the fabrication of various packages which are heat sealed by means of crimped jaw sealers, the coatings tend to cling to the crimp jaw of the heat-sealing machine, causing the machine to jam. For smooth packaging machine operations, the film should readily release from the sealing surface.

It is therefore the principal object of the present invention to provide a vinylidene chloride copolymer-coated thermoplastic film which is suitable for use on sealing machines at high efficiency. It is a further object to provide a vinylidene chloride copolymer-coated film which can be used on crimped jaw sealing machines for the wrapping of products of high moisture content.

According to the present invention, there is provided a composition comprising an aqueous dispersion of a copolymer of vinylidene chloride and at least one other ethylenically unsaturated monomer copolymerizable therewith, and behenic acid. The composition of the invention preferably comprises an aqueous dispersion of a copolymer obtained from between about 60 and about 95 parts by weight of vinylidene chloride, between about 5 parts and about 40 parts by weight of at least one other ethylenically unsaturated monomer copolymerizable therewith, between about 0.1% and about 2% by weight, based upon the total weight of said composition, of a non-ionic surfactant, between about 2% and about 7% by weight, based upon the total composition weight, of a wax having a melting point of at least 75° C. and a hardness value of at least 0.25 kg. per square millimeter at 60° C. between about 0.5% and about 1.5% by weight, based upon the total composition weight, of a glyceryl monoester of a fatty acid having 14 to 22 carbon atoms, and between about 1.5% and about 5.5% by weight, based upon the total composition weight, of behenic acid.

Also, according to the present invention there is provided a process for preparing aqueous vinylidene chloride copolymer dispersions which comprises forming an aqueous emulsion of (a) behenic acid (b) a wax having a melting point of at least 75° C. and a hardness value of at least 0.25 kg./mm.$^2$ at 60° C., and (c) a blending agent of a glyceryl monoester of a fatty acid having 14 to 22 carbon atoms, in the presence of a non-ionic surfactant, (2) introducing an oxidation-reduction polymerization initiator into the emulsion and (3) thereafter introducing slowly and continuously vinylidene chloride monomer and at least one other ethylenically unsaturated monomer copolymerizable therewith, whereby to react the monomers and to obtain an aqueous vinylidene chloride copolymer dispersion containing behenic acid.

According to the present invention there is further provided a moisture-resistant and heat-sealable film structure comprising a base film having firmly adhered to at least one surface thereof a coating comprising a copolymer of vinylidene chloride and at least one other ethylenically unsaturated monomer copolymerizable therewith containing behenic acid. The moisture-resistant and heat-sealable film structure of the present invention preferably comprises a base layer of polypropylene having firmly adhered to at least one surface thereof a coating comprising a copolymer obtained from between about 60 and about 95 parts by weight of vinylidene choride, between about 5 parts and about 40 parts by weight of at least one other ethylenically unsaturated monomer copolymerizable therewith, between about 0.1% and about 2% by weight, based upon the total weight of said composition, of a non-ionic surfactant, between about 2% and about 7% by weight, based upon the total composition weight, of a wax having a melting point of at least 75° C. and a hardness value of at least 0.25 kg. per square millimeter at 60° C. between about 0.5% and about 1.5% by weight, based upon the total composition weight, of a glyceryl monoester of a fatty acid having 14 to 22 carbon atoms, and between about 1.5% and about 5.5% by weight, based upon the total composition weight, of behenic acid.

The nature and advantages of the composition, process and film structure of the present invention will be more clearly understood from the following description thereof.

The composition of the present invention is comprised of a plurality of components. One essential component thereof is a copolymer obtained from vinylidene chloride and at least one other ethylenically unsaturated monomer copolymerizable therewith. The copolymer of vinylidene chloride preferred for purposes of the invention contains between about 60 and 95 parts by weight of vinylidene chloride, and between about 5 and 40 parts of one or more ethylenically unsaturated monomers copolymerizable therewith. Representative mono-olefinic monomers copolymerizable with vinylidene chloride include, for example, acrylic acid, methyl, ethyl, isobutyl, butyl, octyl and 2-ethyl hexyl acrylates and methacrylates; phenyl methacrylate, cocyclohexyl methacrylate, p-cyclohexylphenyl methacrylate, methoxyethyl methacrylate, chloroethyl methacrylate, 2-nitro-2-methylpropyl methacrylate and the corresponding esters of acrylic acid; methyl alpha-chloroacrylate, octyl alpha-chloroacrylate, methyl isopropenyl ketone; acrylonitrile, methacrylonitrile, methyl vinyl ketone, vinyl chloride; vinyl acetate; vinyl propionate; vinyl chloroacetate; vinyl bromide; styrene; vinyl naphthalene; ethyl vinyl ether; N-vinyl phthalimide N-vinyl succinimide; N-vinyl carbazole; isopropenyl acetate; acrylamide; methacrylamide and alkyl substitution products thereof; phenyl vinyl ketone; diethyl fumarate; diethyl maleate; methylene diethyl malonate; dichlorovinylidene fluoride; methacrylic acid; itaconic acid; dimethyl itaconate; diethyl itaconate; dibutyl itaconate; vinyl pyridine; maleic anhydride; allyl glycidyl ether and other unsaturated aliphatic ethers described in U.S. Pat. 2,160,943; or a mixture of ethylenically unsaturated monomers such as, for example, methyl methacrylate, acrylonitrile, methyl acrylate and ethyl acrylate. The monomers may be generally defined as vinyl or vinylidene having a single $CH_2=C$ grouping. The most useful monomers fall with the general formula

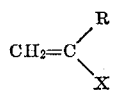

where R may be hydrogen, halogen, or saturated aliphatic radical, and X is a member of the group consisting of —Cl, —Br, —F, —CN, —$C_6H_5$, —COOH,

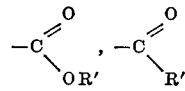

—CH=O, —$OC_6H_5$, —$CONH_2$, —CONH—R' and —CONR'$_2$ in which R' is alkyl.

Another essential component of the composition of the present invention is a non-ionic surfactant. In general, those non-ionic surfactants which lower surface tension of water to not less than about 40 dynes/cm., and preferably to not less than 42.5 dynes/cm., are operable. These include polyoxyalkylene derivatives of various compounds such as those of octylphenol (Triton X–405, X–305, proprietary of the Rohm & Haas Co.), of nonylphenol, and of sorbitan esters such as those of lauric acid, palmitic acid, stearic acid and oleic acid. (Tweens—Atlas Powder Co.). A sufficient amount of the nonionic surfactant is included in the reaction medium to produce micelles. The amounts required may vary with different surfactants. In general, there is employed between about 0.1 and about 2.0 parts thereof per 100 parts of monomer to be polymerized therein.

The wax used in the coating composition of the invention should have a melting point of at least 75° C. and a hardness value of at least 0.25 kg. per square millimeter at 25° C. Among waxes which may be used are the natural waxes such as Carnauba, Ouricuri and Raffia waxes, petroleum waxes such as paraffin and microcrystalline waxes, and synthetic waxes such as the hydrocarbon waxes made by the Fischer-Tropsch synthesis.

A salient feature of the composition of the present invention is that it contains as an essential component behenic acid. The behenic acid is present in the composition of the invention in an amount between about 1 and about 5.5% by weight, based upon the total weight of the composition.

The blending agents employed in the behenic acid-containing composition of the invention include the monoglycerides such as glyceryl monostearate and the corresponding mono-oleate, laurate, palmitate as well as the monoglyceride of behenic acid.

The coating dispersions of the invention are of primary interest for coating film structures, i.e., self-supporting film structures, of polyolefins such as polypropylene. However, they also can be used on film structures of polyvinyl fluoride, polyvinyl chloride, polyalkylene terephthalates and isophthalates, polyamides, polyimides, regenerated cellulose, cellulose derivatives such as cellulose acetate, ethyl cellulose and hydroxyethyl cellulose as well as on paper and paper products. In the case of plastic films, their surfaces may be treated for adherability by flame treatment, electrical discharge, chlorination, treatment with ultraviolet light, chemical treatment and combinations of certain of these treatments, all as is well known in the art.

A preferred embodiment of the composition of the present invention comprises an aqueous dispersion of a copolymer of 60 to 95 parts by weight of vinylidene chloride, about 3 to 8 parts by weight of a member selected from the group consisting of acrylic acid and itaconic acid, about 5 to 20 parts by weight of ethyl acrylate, about 5 to 20 parts by weight of a member of the group consisting of methyl methacrylate and acrylonitrile and, based on the weight of the copolymer, 0.1 to 1.0 percent of a nonionic surfactant and 2 to about 7 percent of a wax having a melting point of at least 75° C. and a hardness value of at least 0.25 kg. per square millimeter at 60° C.

The vinylidene chloride content in the preferred copolymeric composition may range from 60 to 95 percent by weight, preferably from 65 to 85 percent. Ethyl acrylate content may range from 5 to about 20 weight percent, with the range of 7 to 15 percent being preferred. Acrylic acid, when a component of the copolymer, may range from 3 to 8 weight percent, and is a preferred component when the coating composition is to be used on polyolefin films such as polypropylene. Acrylic acid may be replaced by itaconic acid for coating of some films such as those of polyalkylene terephthalates or isophthalates and regenerated cellulose.

The coating compositions of the present invention are made by first emulsifying the behenic acid along with a suitable wax. It is found that it is necessary to use a monoglyceride such as glyceryl monostearate as a blending agent along with the wax and behenic acid. The emulsifying agent is a non-ionic surfactant. Once the behenic acid emulsion with wax has been prepared, the vinylidene chloride copolymer is then polymerized in the wax/behenic acid emulsion by copolymerizing the monomers employing a typical redox initiator system such, for example, as ammonium persulfate/sodium bisulphite. Other well known systems can be used as well. In making the preferred dispersions an aqueous solution of the initiator system and a non-ionic surfactant are added to the wax/behenic acid emulsion and placed in the reaction vessel. Then the copolymerizable monomers are slowly fed to the reaction zone. Once the polymerization reaction has begun (which is essentially immediate), the reacting monomers are introduced continuously in a ratio fixed by the composition desired in the final copolymer and at such a rate that a uniform polymerization rate is obtained. Typically, about 0.25 to 4 percent of the total quantity of monomers to be copolymerized is added to the initiator system each minute until the addition has been completed.

The polymerization process is conveniently carried out at atmospheric pressure but superatmospheric pressure can as well be used. While generally elevated temperatures may be used, preferably the refluxing temperature of the vinylidene chloride-monomer mixture, that is around 38–40° C., is employed. The polymerizations may also be carried out at autogenous pressure at elevated temperatures. The essential feature is that the copolymer dispersions must be produced by continuous addition of the monomers to the reaction vessel containing the initiator system, and other parameters of the polymerization can be adapted from the prior art as suits the convenience of the operator.

The initiator system used in the process of the invention can be any of those now known to the art. A suitable system is composed of ammonium persulfate, sodium metabisulfite and ferrous ammonium sulfate. These materials are used as a 0.1 to 2 percent aqueous solution. Other components which could be employed include potassium persulfate, sodium periodate or hydrogen peroxide with reducing agents such as ferrous and cuprous compounds, sulfur compounds, various reducing sugars or levulinic acid.

According to the present invention there is further provided a moisture-resistant and heat-sealable film structure comprising a base film such as, for example, polypropylene, regenerated cellulose, etc., having firmly adhered to at least one surface thereof a coating comprising the composition described hereinabove. The base film is coated with the above described composition by any convenient coating technique. Base films of regenerated cellulose may be prepared in accordance with the method described in U.S. Pat. Nos. 1,548,864 and 1,601,289 utilizing viscose casting techniques as described in any of U.S. Pat. Nos. 2,862,245; 3,073,733; 2,962,766; 3,050,775 and 2,254,203. The gel regenerated cellulose film so produced may be dried by passing the film over and in contact with a series of heated rolls in a heated chamber, as described in any of U.S. Pat. Nos. 2,000,079; 2,141,277; 2,746,166 and 2,746,167. The dried regenerated cellulose films so prepared contain usually about 5% to about 30% by weight, based upon the total weight of the cellulosic film, of a propylene glycol, and optionally between about 1% and about 10% by weight, based upon the total weight of the cellulosic film, of glycerol.

Film structures coated with the coating composition of this invention are useful for packaging a variety of products, particularly products of high moisture content, such as food stuffs, candy, bakery goods, tobacco and the like. Further, articles can be packaged in the films of the invention at high efficiency on the so-called crimp jaw sealing machine for the so-called make and fill bag market.

Film structures coated with the coating composition of the invention can be laminated to metal foils and to other films such as polymer coated cellophane and coated thermoplastic films. Such structures can also be made by thermal lamination or by use of appropriate adhesives, such as the dextrine, natural and synthetic rubber latices and heat activated waxes and wax combinations with resins such as ethylene/vinyl acetate copolymers.

The principle and practice of the present invention will now be illustrated by the following examples which are provided to show the practice and use thereof, but it is not intended that the invention be limited thereto since modifications in technique and operation will be apparent to anyone skilled in the art. All parts and percentages in the following examples are by weight unless otherwise indicated.

The test samples of coated base film prepared in the following examples were evaluated in accordance with the following testing procedures:

Heat-seal strength is measured by cutting a piece of coated film, 4 x 10 in., into two pieces, 4 x 5 in. each, with the long direction being in the direction of polymer extrusion (the machine direction). The two pieces are then superimposed so that the coated surfaces are in contact. The two pieces of superimposed film are then sealed together at each end at right angles to the machine direction axis. For these tests, the films are sealed using a pressure of 10 p.s.i. for a 0.25 second dwell time and at the specified temperature. The sealed sheets are then cut in half at right angles to the machine direction axis. From the center of the resulting pieces, one inch wide strips parallel to the machine axis are cut. These are conditioned at 75° F. for one day, and 35% and 81% relative humidity, respectively, and then tested by placing the free ends of the strips in a Suter Tester Machine and pulling them apart. The highest force in grams required to pull the strips apart is taken as a measure of the heat-seal bond strength.

Peel strength is measured by attempting to lift the coating from the base film with a sharp-edged instrument such as a knife. If the coating cannot be lifted without rupture of the coating itself, the bond is labelled "No Peel" (NP). If the coating can be lifted, a one inch wide strip of adhesive tape is attached to the loosened strip which is then pulled off at any angle of 180°. The bond so obtained can be labeled "can peel" or the actual force required to pull off the strip of coating can be recorded. For these experiments, prior to testing the coated film samples are immersed in water at 45° C. for 16 hours.

Blocking is measured by stacking 15 to 20 sheets of 4 x 4 in. test film samples front to back. The stack of test samples is placed between two 4 x 4 in. sheets of chipboard and wrapped to form a package in waxed kraft paper. The package is placed on a smooth sheet of metal at least 1/16 in. thick and approximately 6 in. square. A 4 x 4 in. lead weight with a smooth face and having a weight of 25 lbs. (1.5 lbs./sq. in.) is accurately placed on the package of sheets, and the entire assembly is placed in an oven maintained at 52° C. for 16 hours. The package of sheets is removed from the oven and allowed to cool to room temperature (one hour or more). The cooled package of sheets is carefully unwrapped, the chipboard removed, and the stack of sheets grasped by thumb and forefinger in the center of the stack. A shearing force is then applied with care taken to avoid bending the stack or disturbing its edges.

The stack is graded as follows:

Grade 1—the sheets slide apart individually with no tendency whatever to cling together.

Grade 2—the stack separates into 2 or more groups of sheets which remain moderately firmly matted together.

Grade 3—the stack cannot be separated by straight shearing force and can be separated only by peeling the sheets apart.

Grade 4—the sheets are stuck tightly together and cannot be separated without damage to the coating in peeling the sheets apart.

Coated films having Grade 1 blocking are preferred. Coated films having Grade 2 blocking can be used. For some applications, coated films with Grade 3 blocking can be used, but coated films with Grade 4 blocking are unsatisfactory for most purposes.

Crimp jaw release is measured by sealing two film samples each 6 in. wide together between crimped sealing jaws to form a sealed area measuring 6 in. by 0.5 in. The sealed films are mounted on a strain gauge, which is in turn connected to a recorder and the total force in grams necessary to remove the sealed films from the sealer jaws is automatically measured and recorded.

EXAMPLE

A 70/10/15/5 vinylidene chloride/ethyl acrylate/methyl methacrylate/acrylic acid copolymer coating composition is made by first emulsifying four parts of behenic acid, 5 parts of carnauba wax (M.P. 86° C.; hardness—0.47 kg./mm.$^2$ at 60° C.—ASTM–D1474–62T—Method B) and 1 part of glycerol monostearate and 2 parts of Triton X–405 (octylphenol/ethylene oxide polymer product of Rohm & Haas Co.), and melting together the ingredients, after which 88 parts of hot water is added slowly with stirring to give a smooth, stable emulsion. This emulsion is then adjusted to give a dispersion comprising 580 parts of water and 60 parts of the wax dispersion containing 1.2 parts of Triton X–405, 3 parts of carnauba wax and 3.4 parts of behenic acid. To this there is added the initiator system consisting of 0.8 part of ammonium persulfate, 0.8 part of sodium meta bisulfite and 0.003 part of ferrous ammonium sulfate, the whole being added under nitrogen and being flushed into the reactor with 100 parts of water. The individual monomers; namely, vinylidene chloride, ethyl acrylate, methyl methacrylate and acrylic acid are then introduced into the reactor in the respective amounts of 280/40/60/20 parts. Polymerization begins almost immediately. A steady refluxing of the reaction mixture is maintained through the cycle of 65 minutes at a temperature in the range of 38 to 40° C.

The resulting aqueous dispersion above obtained is coated on both side surfaces of a biaxially oriented, flame treated polypropylene film at a coating thickness of about 6 grams per square meter. The resulting coated films show a blocking grade of 2, show No Peel adhesion after immersion in water at 45° C. for 16 hours and show heat-seal strength of 280, 350, 350 grams per inch when sealed respectively at 100° C., 110° C. and 130° C., and further show a heat-seal strength of 330 grams per inch when sealed at 130° C. and conditioned for 16 hours at 81% R.H. When subjected to crimp jaw release test, the test film shows a value of 190 grams at 90° C. to release the film from the sealing jaw. A similar result is obtained with a 76/19/5 vinylidene chloride/methyl acrylate/acrylic acid copolymer.

As a control an oriented, flame treated polypropylene film is coated with a dispersion prepared as described above but without the addition of the behenic acid. The control film shows a crimp jaw release value of greater than 1,000 grams when sealed at 90° C.

In further experiments to determine the conditions required for making a stable, aqueous dispersion of behenic acid, it is observed that a stable emulsion cannot be formed from a mixture of behenic acid with Triton X–405 alone. In a still further experiment, 6 parts of behenic acid and 4 parts of carnauba wax are melted with 2 parts of Triton X–305 and 90 parts of hot water is added slowly with stirring. An emulsion is formed which, however, separates after 2 days of standing. When the Triton X–305 is replaced by Triton X–405, an emulsion is not formed.

In a still further comparative experiment, 4 parts of behenic acid, 5 parts carnauba wax and 1 part of glycerol monostearate are melted with 2 parts of Triton X–405 and hot water is added as indicated. An emulsion is formed which is stable for 4 weeks. Th advantage of using the glycerol monostearate as the blending agent is thus clearly illustrated.

What is claimed is:

1. A composition comprising an aqueous dispersion of a copolymer obtained from between about 60 parts and about 95 parts by weight of vinylidene chloride and between about 5 parts and about 40 parts by weight of at least one other ethylenically unsaturated monomer copolymerizable therewith and the following additional ingredients: between about 1% and about 5.5% of behenic acid, between about 0.1% and about 1% of a non-ionic surfactant, between about 2% and about 7% of a wax having a melting point of at least 75° C. and a hardness value of at least 0.25 kg. per square millimeter at 60° C., and between about 0.5% and about 1.5% of a glyceryl monoester of a fatty acid having 14 to 22 carbon atoms, all percentages being by weight and based on the total weight of the composition.

2. The composition of claim 1 wherein the ethylenically unsaturated monomer comprises acrylonitrile.

3. The composition of claim 1 wherein the ethylenically unsaturated monomer comprises methyl methacrylate.

4. The composition of claim 1 wherein the ethylenically unsaturated monomer comprises methyl acrylate.

5. The composition of claim 1 wherein the ethylenically unsaturated monomer comprises ethyl acrylate.

6. The composition of claim 1 wherein the ethylenically unsaturated monomer comprises a mixture of any two of methyl methacrylate, acrylonitrile, methyl acrylate and ethyl acrylate.

7. The composition of claim 6 wherein said monomer additionally includes acrylic acid, itaconic acid and methacrylic acid or mixtures of acrylic and methacrylic acids.

8. The composition of claim 7 wherein said additional monomer is a mixture of acrylic acid and methacrylic acid.

9. A coating composition comprising an aqueous dispersion of a copolymer of between about 60 and about 95 parts by weight of vinylidene chloride, between about 5 and about 20 parts by weight of ethyl acrylate, between about 5 and about 20 parts by weight of a member of the group consisting of methyl methacrylate and acrylonitrile, between about 3 and about 8 parts by weight of an unsaturated organic acid of the group consisting of acrylic acid and itaconic acid, between about 0.1 and about 1.0% by weight, based on the weight of said composition, of a non-ionic surfactant, between about 2% and about 7% by weight, based upon the total composition weight, of a wax having a melting point of at least 75° C. and a hardness value of at least 0.25 kg. per square millimeter at 60° C., between about 0.5% and about 1.5% by weight, based upon the total composition weight, of a glyceryl monoester of a fatty acid having 14 through 22 carbon atoms, and between about 1% and about 5.5% by weight, based upon the total composition weight, of behenic acid.

10. The composition of claim 9 wherein the wax is a natural wax.

11. A process for preparing aqueous vinylidene chloride copolymer dispersion which comprises (1) forming an aqueous emulsion of (a) between about 1% and 5.5%, by weight, of behenic acid, (b) a wax having a melting point of at least 75° C. and a hardness value of at least 0.25 kg./mm.$^2$ at 60° C., and (c) a blending agent of a glyceryl monoester of a fatty acid having 14 to 22 carbon atoms, in the presence of a non-ionic surfactant, (2) introducing an oxidation-reduction polymerization initiator into the emulsion and (3) thereafter introducing slowly and continuously from about 60 to 95 parts by weight of vinylidene chloride monomer and from about 5 to 40 parts by weight of at least one other ethylenically unsaturated monomer copolymerizable therewith, whereby to react the monomer and to obtain an aqueous vinylidene chloride copolymer dispersion containing behenic acid.

References Cited

UNITED STATES PATENTS

| | | | |
|---|---|---|---|
| 2,541,167 | 2/1951 | Pitzl | 260—29.6 TA |
| 2,711,996 | 6/1955 | Hofrichter | 260—28.5 D |
| 3,248,374 | 4/1966 | Covington | 260—29.6 TA |
| 3,309,330 | 3/1967 | Settlage | 260—29.6 TA |
| 3,387,997 | 6/1968 | Sculley | 260—28.5 D |

OTHER REFERENCES

A. H. Warth, "The Chemistry and Technology of Waxes," 2nd edition, 1956, pp. 34–35.

MORRIS LIEBMAN, Primary Examiner

P. R. MICHL, Assistant Examiner

U.S. Cl. X.R.

117—47 A, 138.8 A, 145, 155 UA, 161 UZ; 260—29.6 T, 29.6 TA